US012002350B2

(12) United States Patent
Park et al.

(10) Patent No.: US 12,002,350 B2
(45) Date of Patent: Jun. 4, 2024

(54) SYSTEM FOR DETECTING PEDESTRIAN AT CROSSWALK AND PREVENTING ACCIDENT ON BASIS OF ARTIFICIAL INTELLIGENCE

(71) Applicant: MJVISIONTECH CO., LTD., Daegu (KR)

(72) Inventors: Young Seok Park, Daegu (KR); Jae Il Lee, Daegu (KR); Young Jin Kim, Daegu (KR)

(73) Assignee: MJVISIONTECH CO., LTD., Buk-gu daegu (KR)

( * ) Notice: Subject to any disclaimer, the term of this patent is extended or adjusted under 35 U.S.C. 154(b) by 101 days.

(21) Appl. No.: 17/789,503

(22) PCT Filed: Dec. 7, 2020

(86) PCT No.: PCT/KR2020/017751
§ 371 (c)(1),
(2) Date: Jun. 27, 2022

(87) PCT Pub. No.: WO2021/132935
PCT Pub. Date: Jul. 1, 2021

(65) Prior Publication Data
US 2023/0045677 A1 Feb. 9, 2023

(30) Foreign Application Priority Data
Dec. 26, 2019 (KR) .................. 10-2019-0175596

(51) Int. Cl.
*G08G 1/005* (2006.01)
*G06T 7/70* (2017.01)
(Continued)

(52) U.S. Cl.
CPC ............... *G08G 1/005* (2013.01); *G06T 7/70* (2017.01); *G06T 7/90* (2017.01); *G06V 10/56* (2022.01);
(Continued)

(58) Field of Classification Search
CPC .......... G08G 1/005; G08G 1/095; G06T 7/70; G06T 7/90; G06T 2207/10024;
(Continued)

(56) References Cited

U.S. PATENT DOCUMENTS 8,903,640 B2 * 12/2014 Caminiti .............. G08G 1/0104
340/901

FOREIGN PATENT DOCUMENTS

KR 10-2008-0018333 A 2/2008
KR 10-1233929 B1 2/2013
(Continued)

OTHER PUBLICATIONS

KR Office Action dated Jan. 13, 2021 as received in Application No. 10-2019-0175596.
(Continued)

*Primary Examiner* — Hongmin Fan
(74) *Attorney, Agent, or Firm* — Maschoff Brennan

(57) ABSTRACT

A system for detecting a pedestrian at a crosswalk and preventing an accident on the basis of artificial intelligence, the system comprising: a camera device installed on a mast arm installed at the top of a traffic light pole installed at a crosswalk to capture pedestrians and the vicinity of the crosswalk; a pedestrian detection module for detecting a pedestrian in an image captured by the camera device through a pre-installed image analysis solution; a color detection module for detecting a current blinking color of a traffic light consisting of a pedestrian traffic light and a driving traffic light; and a warning signal output module for
(Continued)

outputting an unauthorized crossing warning message to the pedestrian waiting at the crosswalk according to a detection result of the color detection module and a detection result of the pedestrian detection module.

5 Claims, 2 Drawing Sheets

(51) Int. Cl.
   *G06T 7/90*   (2017.01)
   *G06V 10/56*  (2022.01)
   *G06V 20/52*  (2022.01)
   *G06V 40/10*  (2022.01)
   *G06V 40/20*  (2022.01)
   *G08G 1/095*  (2006.01)

(52) U.S. Cl.
   CPC .............. *G06V 20/52* (2022.01); *G06V 40/10* (2022.01); *G06V 40/20* (2022.01); *G08G 1/095* (2013.01); *G06T 2207/10024* (2013.01); *G06T 2207/30196* (2013.01); *G06T 2207/30232* (2013.01)

(58) Field of Classification Search
   CPC ........... G06T 2207/30196; G06T 2207/30232; G06V 10/56; G06V 20/52; G06V 40/10; G06V 40/20
   See application file for complete search history.

(56) References Cited

FOREIGN PATENT DOCUMENTS

| | | | | |
|---|---|---|---|---|
| KR | 10-2016-0095276 A | | 8/2016 | |
| KR | 10-2018-0028170 A | | 3/2018 | |
| KR | 1998336 | * | 9/2018 | ............... E01F 9/61 |
| KR | 10-1906569 B1 | | 12/2018 | |
| KR | 20210065219 | * | 11/2019 | ............. G08G 1/075 |
| RU | 2730790 | * | 1/2017 | ............. G06V 10/25 |

OTHER PUBLICATIONS

KR Decision to Grant Dated Jul. 8, 2021 as received in Application No. 10-2019-0175596.

* cited by examiner

[FIG.1]
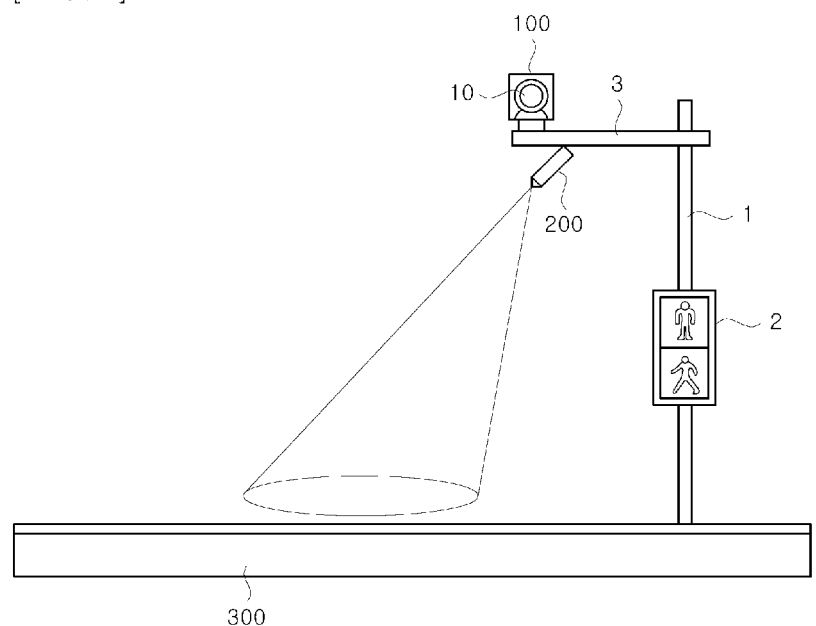
[FIG.2]
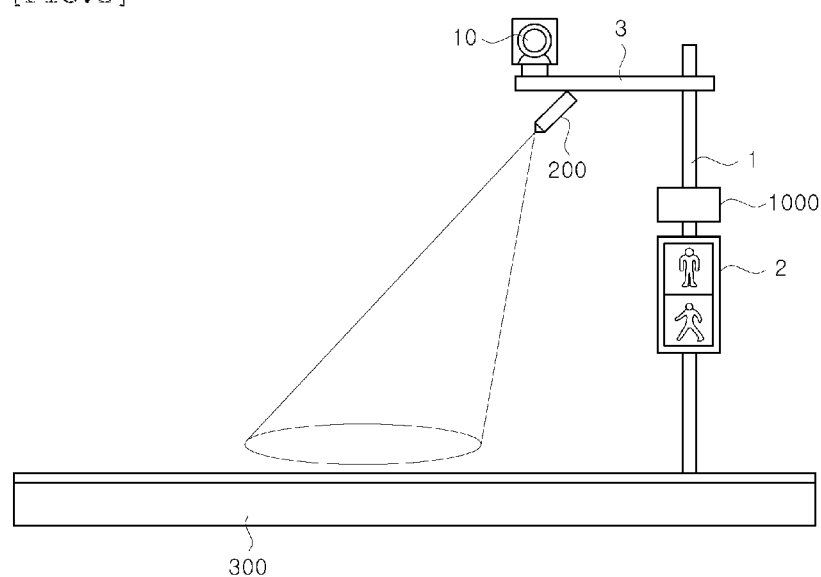

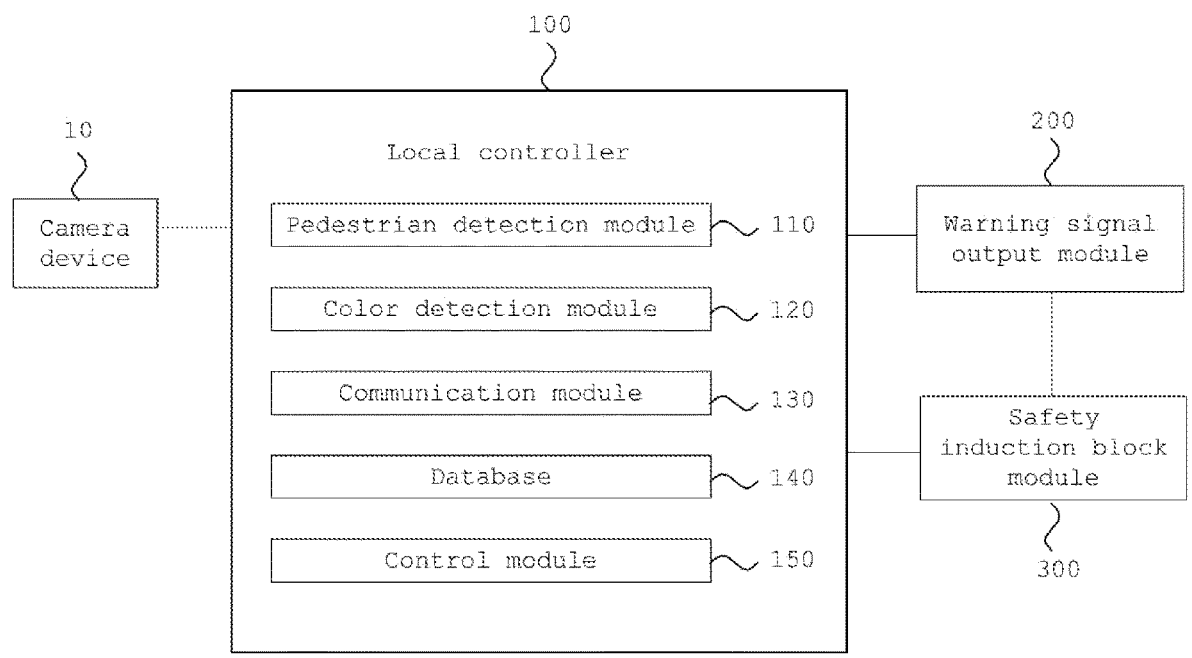
[FIG.3]

SYSTEM FOR DETECTING PEDESTRIAN AT CROSSWALK AND PREVENTING ACCIDENT ON BASIS OF ARTIFICIAL INTELLIGENCE

TECHNICAL FIELD

The present invention relates to a method of detecting a pedestrian at a crosswalk and a method of preventing an accident by determining a dangerous situation and guiding a warning message before the situation occurs.

BACKGROUND ART

As accident prevention campaigns increase, and ITS-related technologies are developed, a number of pedestrians who die in traffic accidents in one year has been continuously decreased. However, Korea still has a number of pedestrian deaths that is higher than an average of numbers of pedestrian deaths of OECD countries.

In order to reduce a pedestrian death rate that is still high, introduction of technologies for recognizing a pedestrian at an intersection or a crosswalk to recognize and prevent a dangerous situation has been gradually increased.

However, since an existing system stays at a level of finding a movement of a pedestrian based on a sensor, the system may not actually predict a dangerous situation of the pedestrian in advance, and since the system uses only the movement as basis of determination, a false detection rate may be increased so that an accident prevention rate may be decreased.

DETAILED DESCRIPTION OF THE INVENTION

Technical Problem

In order to improve the problems described above, an object of embodiments of the present invention is to provide a system for detecting a pedestrian at a crosswalk and preventing an accident on basis of artificial intelligence, capable of preventing occurrence of an accident by detecting a pedestrian, detecting and analyzing a situation in which a pedestrian ignores a signal to jaywalk through artificial intelligence, and predicting a dangerous situation.

Another object of the embodiments of the present invention is to provide a system for detecting a pedestrian at a crosswalk and preventing an accident on basis of artificial intelligence, capable of providing a method of predicting a situation of jaywalking in advance and preventing an accident by detecting an object referred to as a pedestrian and recognizing a behavior of the pedestrian through deep learning-based data learning.

Technical Solution

In order to achieve the above objects, according to one embodiment of the present invention, a system for detecting a pedestrian at a crosswalk and preventing an accident on basis of artificial intelligence includes: a camera device installed on a mast arm, which is installed at a top of a traffic light pole installed at the crosswalk, to capture the pedestrian and a periphery of the crosswalk; a pedestrian detection module for detecting the pedestrian in an image captured by the camera device through a pre-installed image analysis solution; a color detection module for detecting a current blinking color of a traffic light including a pedestrian traffic light and a driving traffic light; and a warning signal output module for outputting a jaywalking warning message to the pedestrian waiting at the crosswalk according to a detection result of the color detection module and a detection result of the pedestrian detection module.

The system for detecting the pedestrian at the crosswalk and preventing the accident on the basis of the artificial intelligence may further include: a safety induction block module installed on a bottom surface of the crosswalk so as to be controlled in conjunction with the traffic light to perform blinking; a communication module for transmitting, when the detection result of the color detection module and the detection result of the pedestrian detection module are determined as jaywalking or an abnormal behavior of the pedestrian, a determination result to an outside; a database for storing the detection result of the color detection module, the detection result of the pedestrian detection module, and determination result information on the jaywalking or the abnormal behavior analyzed by the warning signal output module; and a control module for controlling operations of the camera device, the pedestrian detection module, the color detection module, the warning signal output module, the safety induction block module, the communication module, and the database.

The warning signal output module may detect the current blinking color of the traffic light based on blinking information of the safety induction block module, which is obtained from the camera device.

The warning signal output module may determine an abnormal behavior pattern state of the pedestrian through a pre-installed behavior analysis solution in the image captured by the camera device.

In a case where the traffic light operates with a night blinking signal, when the pedestrian is detected by the pedestrian detection module, the control module may switch the traffic light into a normal blinking signal, and operate the safety induction block module.

The warning signal output module may include an LED lighting controller installed on a lower side of the mast arm.

The control module may be coupled to the camera device on the mast arm so as to be installed on the mast arm, or installed on one side of a support pole that is vertically installed on a ground while being located inside a housing.

Advantageous Effects

According to the system for detecting the pedestrian at the crosswalk and preventing the accident on the basis of the artificial intelligence of one embodiment of the present invention, the occurrence of the accident can be prevented by detecting the pedestrian, detecting and analyzing the situation in which the pedestrian ignores the signal to jaywalk through the artificial intelligence, and predicting the dangerous situation.

In addition, according to one embodiment of the present invention, the method of predicting the situation of jaywalking in advance and preventing the accident by detecting the object referred to as the pedestrian and recognizing the behavior of the pedestrian through the deep learning-based data learning can be provided.

DESCRIPTION OF THE DRAWINGS

FIG. 1 is a view showing a system for detecting a pedestrian at a crosswalk and preventing an accident on basis of artificial intelligence according to one embodiment of the present invention.

FIG. 2 is a view showing a system for detecting a pedestrian at a crosswalk and preventing an accident on basis of artificial intelligence according to another embodiment of the present invention.

FIG. 3 is a block diagram schematically showing the system for detecting the pedestrian at the crosswalk and preventing the accident on the basis of the artificial intelligence according to one embodiment of the present invention.

MODE FOR INVENTION

Embodiments of the present invention as described above will be described in detail with reference to the accompanying drawings.

It is to be noted that technical terms used herein are used to describe specific embodiments only, and are not intended to restrict the present invention. Further, unless defined otherwise in the present disclosure, the technical terms used herein are to be interpreted to have the meaning generally understood by a person having ordinary skill in the art to which the present invention pertains, and are not to be interpreted to have an excessively comprehensive meaning or an excessively narrow meaning. In addition, when the technical term used herein is an erroneous technical term that does not accurately express the idea of the present invention, the technical term is to be understood as a replaced technical term that may be correctly understood by those skilled in the art. Further, general terms used herein are to be interpreted as defined in dictionaries or according to the context before and after the terms, and are not to be interpreted to have an excessively reduced meaning.

In addition, unless the context explicitly dictates otherwise, an expression in a singular form used herein includes a meaning of a plural form. In the present disclosure, the term such as "comprising" or "including" is not to be interpreted as necessarily including all of various elements or various steps described herein, and is to be interpreted as not including some elements or some steps among the various elements or steps or as further including additional elements or steps.

Further, although the terms including an ordinal number such as "first" or "second" used herein may be used to describe the elements, the elements are not to be limited by the terms. The terms are used only for the purpose of distinguishing one element from another element. For example, a first element may be termed as a second element, and similarly, a second element may also be termed as a first element without departing from the scope of the present invention.

Hereinafter, a preferred embodiment of the present invention will be described in detail with reference to the accompanying drawings, in which identical or similar elements will be given the same reference numerals regardless of the figure number, and redundant descriptions thereof will be omitted.

In addition, in the following description of the present disclosure, detailed descriptions of known technologies incorporated herein will be omitted when they make the gist of the present invention rather unclear. Further, it is to be noted that the accompanying drawings are only for an easy understanding of the idea of the present invention, and the idea of the present invention is not to be construed as being limited by the accompanying drawings.

FIG. 1 is a view showing a system for detecting a pedestrian at a crosswalk and preventing an accident on basis of artificial intelligence according to one embodiment of the present invention, FIG. 2 is a view showing a system for detecting a pedestrian at a crosswalk and preventing an accident on basis of artificial intelligence according to another embodiment of the present invention, and FIG. 3 is a block diagram schematically showing the system for detecting the pedestrian at the crosswalk and preventing the accident on the basis of the artificial intelligence according to one embodiment of the present invention.

Referring to FIGS. 1 and 3, a system for detecting a pedestrian at a crosswalk and preventing an accident on basis of artificial intelligence according to one embodiment of the present invention may correspond to an embodiment in which a local controller is installed in each traffic light, and may include a camera device 10, a local controller 100, a warning signal output module 200, and a safety induction block module 300.

First, the crosswalk may be located across a road, and traffic light poles may be installed on both sides of a sidewalk, respectively. The traffic light pole may include a support pole 1 that is vertically installed on a ground, and a mast arm 3 installed on a top of the support pole 1.

In this case, a pedestrian traffic light 2 may be installed on the support pole 1 of the traffic light pole, and a driving traffic light (not shown), the camera device 10, and the local controller 100 may be installed on the mast arm 3 of the traffic light pole. Although the local controller 100 has been shown in FIG. 1 as being installed on the mast arm 3 of the traffic light pole, the local controller 1000 has been shown in FIG. 2, which is another embodiment, as being installed on the support pole 1 of the traffic light pole.

According to the present embodiment, the local controllers 100 and 1000 may be configured such that a pedestrian detection module 110, a color detection module 120, a communication module 130, a database 140, and a control module 150 are provided inside one housing in a form of a PCB so as to be coupled to the camera device 10 or installed independently on the support pole 1.

The local controller 100 may analyze a pedestrian signal or a driving signal at the crosswalk to detect the pedestrian, detect and analyze a situation in which the pedestrian ignores a signal to jaywalk through the artificial intelligence, and predict a dangerous situation, so that a jaywalking prohibition phrase may be displayed on the road by using the warning signal output module 200, and the safety induction block module 300 provided on the crosswalk may be operated to display a current traffic light state.

The camera device 10 refers to a device installed on the mast arm 3, which is installed at a top of the traffic light pole installed at the crosswalk, to capture the pedestrian and a periphery of the crosswalk. The camera device 10 may be a network or integrated camera, and may obtain image information of all pedestrians by viewing an entire crosswalk. An image obtained by the camera device 10 may be stored in the local controller 100, and simultaneously, may be subject to pedestrian detection and situation analysis by using the local controller 100 based on the artificial intelligence. In addition, the image information obtained by the camera device 10 may be stored in the database 140 so as to be subject to a search, or may be transmitted to a management terminal or a server device through a communication unit provided in the control module 150. However, the image information obtained by the camera device 10 may not be stored in the database 140 so as to be free from invasion of personal information.

The camera device 10 may be installed on an upper side of the mast arm 3 of the traffic light pole to capture the periphery of the crosswalk so as to monitor a behavior of the pedestrian.

In addition, the camera device 10 may capture a vehicle as well as the pedestrian. In other words, while information on the pedestrian may be provided to a driver to allow the driver to recognize the pedestrian, it is preferable to allow the pedestrian to recognize the vehicle and pay attention to walking on the road. To this end, it is preferable to allow a camera to simultaneously capture the pedestrian and the vehicle so that vehicle information captured by the camera device 10 may be notified to the pedestrian.

In addition, since a behavior radius of the pedestrian and a movement radius of the vehicle are different from each other, two cameras may be separately installed so that one camera may capture the pedestrian, and the other camera may capture the vehicle.

The pedestrian detection module 110 refers to a device for detecting the pedestrian in the image information captured by the camera device 10 through a pre-installed image analysis solution.

In this case, the image analysis solution may be an artificial intelligence-based image analysis program, and may recognize the pedestrian in real time from video data transmitted from the camera device 10 (i.e., the network or integrated camera) that views a location of the pedestrian. The image analysis solution may be an image analysis solution that has been conventionally known and used to detect a movement of a human body, and detailed descriptions thereof will be omitted.

The image analysis solution may communicate with an LED landscape lighting controller (not shown) provided in the warning signal output module 200 in a wired or wireless manner according to a mutually agreed protocol so as to control a light output from the warning signal output module 200.

In addition, the image analysis solution may communicate with the safety induction block module 300 (i.e., an LED safety induction block) in a wired or wireless manner according to a mutually agreed protocol so as to control a color of the safety induction block module 300.

The pedestrian detection module 110 may include a separate additional sensor device (not shown) to detect presence of the pedestrian in a waiting region, which is set as a predetermined region on the sidewalk that is adjacent to the crosswalk, in addition to detecting the pedestrian by using the image analysis solution. In this case, the sensor device may be a motion detection sensor, a Doppler sensor, an ultrasonic sensor, or a sensor obtained by combining at least one of the sensors, which is for detecting a movement of the pedestrian in the waiting region or a walking completion region.

In addition, the sensor device may detect whether the pedestrian moves to the walking completion region that is set as a predetermined region. In this case, a projection region may be set inside the walking completion region, and the waiting region may be set inside the projection region.

The warning signal output module 200 may be operated only while performing switching into a blinking yellow light at night as a result of recognition performed by using the color detection module 120. The warning signal output module 200 may project a predetermined guide message to a region including the waiting region, that is, the projection region. The guide message may be a guide message indicating jaywalking before the pedestrian crosses the crosswalk.

The guide message may be projected by using the warning signal output module 200. According to another embodiment, the guide message may be notified to the pedestrian by a sound. To this end, a speaker may be additionally installed in the warning signal output module 200, and the guide message may be output to the speaker together with an existing warning signal.

The color detection module 120 refers to a device for detecting a current blinking color of a traffic light including a pedestrian traffic light and a driving traffic light. In other words, the color detection module 120 may detect current blinking colors of the pedestrian traffic light and the driving traffic light from the control module 150 or through a separate color identification device (not shown) to provide the detected current blinking colors to the control module 150, and may allow the control module 150 to control an operation of the warning signal output module 200.

In other words, the warning signal output module 200 refers to a device for outputting a jaywalking warning message to the pedestrian waiting at the crosswalk according to a detection result of the color detection module 120 and a detection result of the pedestrian detection module 110.

In other words, the warning signal output module 200 may recognize a current state of the traffic light at the crosswalk, and may notify a risk of the jaywalking in advance when the pedestrian waiting for the signal is detected.

In addition, the warning signal output module 200 may detect the current blinking color of the traffic light based on blinking information of the safety induction block module 300, which is obtained from the camera device 10. In this case, a camera device 10 may be provided separately from the camera device 10 described above to detect the current blinking color of the traffic light.

The warning signal output module 200 may determine an abnormal behavior pattern state of the pedestrian through a pre-installed behavior analysis solution in the image captured by the camera device 10. The behavior analysis solution may be an analysis program for analyzing a behavior pattern of a pedestrian through deep learning, and may compare pre-stored big data on a behavior pattern of user with the behavior pattern of the pedestrian to determine an abnormal behavior state of the pedestrian. For example, the behavior analysis solution may be a sort of image analysis solution, and may detect a case determined as an accident risk situation due to excessive pedestrians on the road, a case where the pedestrian is determined as crossing outside a crosswalk region, or the like to regard the detected case as the abnormal behavior so as to transmit such a situation to the warning signal output module 200 or the control module 150.

The warning signal output module 200 may include an LED lighting controller (not shown) installed on a lower side of the mast arm 3.

The LED lighting controller may adjust an intensity of an LED landscape light under a control of the control module 150 to display the jaywalking warning message so that the pedestrian who is waiting may be alerted.

In addition, when the pedestrian and a driving vehicle are identified on the crosswalk through the image analysis solution, the warning signal output module 200 may be configured to warn the pedestrian that the driving vehicle is nearby or warn a driver of the driving vehicle that the pedestrian is present.

In this case, the warning signal output module 200 may be configured to output a warning message to a front side of the pedestrian or the driver of the driving vehicle in consideration of a movement direction of the pedestrian or the driving vehicle.

For example, the warning signal output module 200 may output an appropriate warning phrase such as "Be careful as a vehicle is approaching." or "Do not cross as a vehicle is passing." to the pedestrian, and may output an appropriate warning phrase such as "Stop as there is a pedestrian.", "Slow down as there is a pedestrian.", or "Slow down as there is an elk." to the driver.

The warning signal output module 200 may be configured as an LED light to irradiate the crosswalk so that pedestrian may safely pass through the crosswalk, and may preferably reduce an illuminance through the LED lighting controller when there is no pedestrian so as to reduce power consumption and prevent glare of a vehicle driver.

The safety induction block module 300 refers to a device installed on a bottom surface of the crosswalk so as to be controlled in conjunction with the traffic light to perform blinking.

The safety induction block module 300 may interwork with the traffic light so that an LED safety induction block may display the same color as the traffic light when the pedestrian waits for the signal.

Although not shown, the safety induction block module 300 may include: a light emitting case having a top surface through which a light is transmitted, and having a rectangular shape in which both sides and a bottom are opened; an LED lighting substrate inserted into an inner upper portion of the light emitting case, in which a plurality of LEDs are installed on an upper portion of the substrate to irradiate an upper portion of the light emitting case with a light; a substrate support block inserted into a lower portion of the LED lighting substrate inside the light emitting case so as to support the LED lighting substrate that is inserted into the inner upper portion of the light emitting case; a buffer member installed between the substrate support block and a base block inside the light emitting case to prevent the light emitting case and the LED lighting substrate from being damaged by a temporary and strong vertical load applied from the upper portion of the light emitting case; the base block installed into an inner lower portion of the light emitting case so as to be landed on a bottom surface to support the light emitting case; and epoxy filled between an inner top of the light emitting case and a top of the LED lighting substrate and between a bottom of the LED lighting substrate and a top of the substrate support block so as to integrally couple the light emitting case, the LED lighting substrate, and the substrate support block to each other and prevent moisture from penetrating into the LED lighting substrate.

The communication module 130 refers to an interface device for transmitting, when the detection result of the color detection module 120 and the detection result of the pedestrian detection module 110 are determined as the jaywalking or the abnormal behavior of the pedestrian, a determination result to an outside (i.e., the management terminal or the server device).

The database 140 refers to a device for storing the detection result of the color detection module 120, the detection result of the pedestrian detection module 110, and determination result information on the jaywalking or the abnormal behavior analyzed by the warning signal output module 200, in which the stored information may be transmitted to a remote management terminal (not shown) or a remote server device (not shown) through the communication module 130 provided in the control module 150 as described above.

The control module 150 refers to a device for controlling operations of the camera device 10, the pedestrian detection module 110, the color detection module 120, the warning signal output module 200, the safety induction block module 300, the communication module 130, and the database 140 by a pre-installed driving program.

In a case where the traffic light operates with a night blinking signal, when the pedestrian is detected by the pedestrian detection module 110, the control module 150 may switch the traffic light into a normal blinking signal, and operate the safety induction block module 300.

The control module 150 may be coupled to the camera device 10 on the mast arm 3 so as to be installed inside the local controller 100 as shown in FIG. 1, or may be installed on one side of the support pole 1 that is vertically installed on a ground while being located inside a housing-type local controller 1000 as shown in FIG. 2.

The control module 150 may comprehensively analyze the state of the traffic light and the behavior of the pedestrian to predict the risk of the jaywalking in advance, and may generate the warning message to induce the pedestrian to stop the behavior when the jaywalking or the abnormal behavior is analyzed.

In addition, the control module 150 may perform functions of transmitting a message that may allow a relevant institution to recognize a situation to the relevant institution in real time when the jaywalking or the abnormal behavior is continuously performed, and transmitting a message to a relevant institution in real time when an accident occurs due to continuous jaywalking or abnormal behavior.

Further, the control module 150 may store all result data obtained by detecting the pedestrian and analyzing the behavior in the database 140 to perform analysis of the big data, and may display an analysis result as jaywalking statistics by a time period.

In addition, the control module 150 may obtain image data of the safety induction block module 300 to analyze a current signal state.

Further, the control module 150 may analyze whether people invade a specific region, transmit an invasion warning by projecting the LED landscape light in a case determined as an invasion situation, and project relevant phrases or images through the LED landscape light according to a type of an object that is detected.

In addition, in a case where a night blinking traffic light operates, when a person is detected at the crosswalk, the control module 150 may switch from a blinking traffic light signal to a normal traffic light signal, and operate the safety induction block module 300.

Although not shown, a flexible solar cell module may be further provided on one side of the mast arm 3 or the support pole 1 of the traffic light, the flexible solar cell module may receive sunlight to generate electricity, the generated electricity may be converted through a conversion device so as to be stored in a storage battery, and the electricity stored in the storage battery may be supplied to an electric device including a lighting lamp under the control of the control module 150.

In other words, the electricity generated by the solar cell module may be converted into electricity that may be supplied to each electric appliance constituting the traffic light according to the present invention, and stored in the storage battery under the control of the control module 150.

The preferred embodiments of the present invention have been shown and described above. However, the present invention is not limited to the embodiment described above, and various modifications can be made by anyone having ordinary skill in the art to which the present invention pertains without departing from the gist of the present invention as defined in the appended claims.

DESCRIPTION OF REFERENCE NUMERALS

1: Support pole
2: Pedestrian traffic light
3: Mast arm
10: Camera device
100: Local controller
110: Pedestrian detection module
120: Color detection module
130: Communication module
140: Database
150: Control module
200: Warning signal output module
300: Safety induction block module

The invention claimed is:

1. A system for detecting a pedestrian at a crosswalk and preventing an accident on basis of artificial intelligence, the system comprising:
   a camera device installed on a mast arm, which is installed at a top of a traffic light pole installed at the crosswalk, to capture the pedestrian and a periphery of the crosswalk;
   a pedestrian detection module for detecting the pedestrian in an image captured by the camera device through a pre-installed image analysis solution;
   a color detection module for detecting a current blinking color of a traffic light including a pedestrian traffic light and a driving traffic light;
   a warning signal output module for outputting a jaywalking warning message to the pedestrian waiting at the crosswalk according to a detection result of the color detection module and a detection result of the pedestrian detection module,
   a safety induction block module installed on a bottom surface of the crosswalk so as to be controlled in conjunction with the traffic light to perform blinking;
   a communication module for transmitting, when the detection result of the color detection module and the detection result of the pedestrian detection module are determined as jaywalking or an abnormal behavior of the pedestrian, a determination result to an outside;
   a database for storing the detection result of the color detection module, the detection result of the pedestrian detection module, and determination result information on the jaywalking or the abnormal behavior analyzed by the warning signal output module; and
   a control module for controlling operations of the camera device, the pedestrian detection module, the color detection module, the warning signal output module, the safety induction block module, the communication module, and the database, wherein:
   the warning signal output module detects the current blinking color of the traffic light based on blinking information of the safety induction block module, which is obtained from the camera device.

2. The system of claim 1, wherein the warning signal output module determines an abnormal behavior pattern state of the pedestrian through a pre-installed behavior analysis solution in the image captured by the camera device.

3. The system of claim 1, wherein, in a case where the traffic light operates with a night blinking signal, when the pedestrian is detected by the pedestrian detection module, the control module switches the traffic light into a normal blinking signal, and operates the safety induction block module.

4. The system of claim 1, wherein the warning signal output module includes an LED lighting controller installed on a lower side of the mast arm.

5. The system of claim 1, wherein the control module is coupled to the camera device on the mast arm so as to be installed on the mast arm, or installed on one side of a support pole that is vertically installed on a ground while being located inside a housing.

* * * * *